United States Patent

[11] 3,621,076

| [72] | Inventors | Walter F. De Winter<br>45 Antwerpen Straat, Mortsel, Belgium;<br>Jack Preston, 2703 Ashland St., Raleigh,<br>N.C. 27608 |
|---|---|---|
| [21] | Appl. No. | 849,140 |
| [22] | Filed | Aug. 11, 1969 |
| [45] | Patented | Nov. 16, 1971 |

[54] BLOCK POLYHETEROCYCLIC POLYIMIDE ELASTOMERS HAVING HIGH THERMAL RESISTANCE
7 Claims, No Drawings

[52] U.S. Cl........................................................ 260/857,
260/30.6, 260/30.8, 260/32.4, 260/32.6, 260/78
[51] Int. Cl......................................................C08g 41/04,
C08g 20/00
[50] Field of Search........................................... 260/857

[56] References Cited
UNITED STATES PATENTS

| 3,288,754 | 11/1966 | Green.......................... | 260/857 |
|---|---|---|---|
| 3,422,061 | 1/1969 | Gall.............................. | 260/857 |
| 3,440,215 | 4/1969 | Holub.......................... | 260/857 |
| 3,484,407 | 12/1969 | Preston ....................... | 260/47 |

Primary Examiner—Paul Lieberman
Attorneys—Stanley M. Tarter and John W. Whisler

ABSTRACT: Segmented aromatic imide polymers useful for spinning into elastic manmade filaments are provided. Relatively low-melting polymeric amic-acid segments resulting from combining selected o-phthalic acid derived diamines with aromatic dianhydrides and relatively high-melting polymeric amic-acid segments resulting from combining isophthalic acid or terephthalic acid derived diamines with aromatic dianhydrides are joined together and heated to form a segmented elastomeric polyimide.

3,621,076

BLOCK POLYHETEROCYCLIC POLYIMIDE ELASTOMERS HAVING HIGH THERMAL RESISTANCE

BACKGROUND OF THE INVENTION

Work in recent years in the field of synthetic polyurethane elastomers has led to the development of segmented elastomers, generically known as spandex. One segment, which if standing alone would soften or melt at a low-temperature, is combined in an essentially linear molecule with another segment having a relatively high softening or melting point to form the segmented elastomer. In these spandex elastomers the low-melting segment can be derived from a polyether or polyester diol which at ordinary temperatures is a liquid or a low-melting solid. The high-melting segment can be a polymeric urethane or urea, or a urethane/urea, made by reaction of a diisocyanate with a glycol, diamine, or water.

The combination of these two types of segments results in a polymer having elastic properties as manifested in strands made therefrom. The low-softening segment imparts internal mobility to the molecules, while the high-softening segment gives strength and resistance to elongation or other change of shape. The net result is elasticity, wherein the structure, when deformed upon application of external force, returns to its original shape and size when force is removed. These known elastomers are rather thermally unstable, unfortunately, decomposing in the neighborhood of 200° C.

It is also known to produce a thermally stable polyimide by the polycondensation of the anhydride of a polybasic aromatic acid and an aromatic diamine. Compared with most other polymers, many polyimides possess unusually good resistance to high-temperatures, having softening points in the region of 700° C. However, the polyimides in strand form are rigid, having little or no elasticity.

There exists in the art a keen need for a fiber-forming elastomer having a combination of high-thermal stability and of high-elasticity at temperatures above 200° C.

SUMMARY OF THE INVENTION

An essentially linear block aromatic imide polymer capable of being shaped into fibers and filaments having high-thermal stability and high elasticity even at elevated temperatures above 200° C. is provided. The polymer is more particularly characterized by having the following repeated structural units

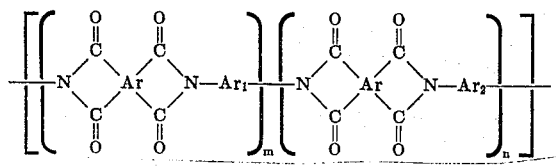

Ar is a tetravalent aromatic or heterocyclic single, multiple, or fused ring system, said ring system being characterized by benzenoid unsaturation, the four carbonyl groups being attached directly to separate carbon atoms of the ring system, each pair of carbonyl groups being attached to adjacent carbon atoms of the Ar radical. $Ar_1$ is a divalent aromatic or heterocyclic single, multiple, or fused ring system, said ring system being characterized by benzenoid unsaturation and particularly characterized by being a residue of o-phthalic acid derived diamine. $Ar_2$ is also a divalent aromatic or heterocyclic single, multiple, or fused ring system, said ring system being characterized by benzenoid unsaturation but particularly characterized by being a residue of an isophthalic acid or terephthalic acid derived diamine. Ar $Ar_1$, and $Ar_2$ can optionally contain connecting linkages other than carbon-carbon, such as

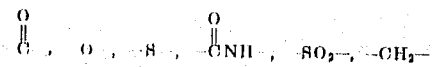

$m$ and $n$ are whole numbers averaging from 3 to about 100 with $m$ segments comprise 35–65 percent of the block polymer, and $n$ segments comprise 65–35 percent thereof.

DETAILED DESCRIPTION OF THE INVENTION

This invention provides segmented aromatic imide polymers. Relatively low-melting segments are made from combining selected phthalic acid derived diamines with aromatic dianhydrides, and relatively high-melting segments are made from combining isophthalic acid and/or terephthalic acid derived diamines with aromatic dianhydrides. These segments are polycondensed, and the resulting segmented polyamic acid is heated to convert the same to a thermally stable segmented elastomeric polyimide.

The reactivity of the two segments results from using a slight excess of diamine in making the low-melting segments and an equal excess of dianhydride in making the higher melting segments (or vice versa), thereby also assuring substantially stoichiometric equivalence in the resulting intermediate amic-acid polymer.

The chemistry of the formation of the segmented aromatic imide polymer is illustrated below where pyromellitic dianhydride is the aromatic dianhydride, $Ar_1$ of the above formula is

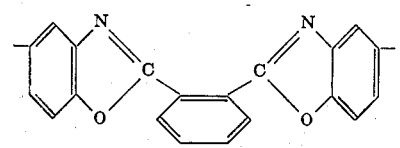

and $Ar_2$ of the above formula is

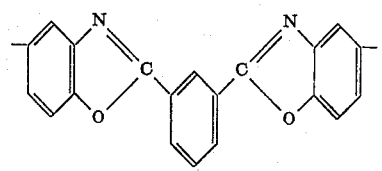

Thus, when $NH_2-Ar_1-NH_2$ in excess is reacted with pyromellitic anhydride the following reaction occurs to produce the low-melting segment (I).

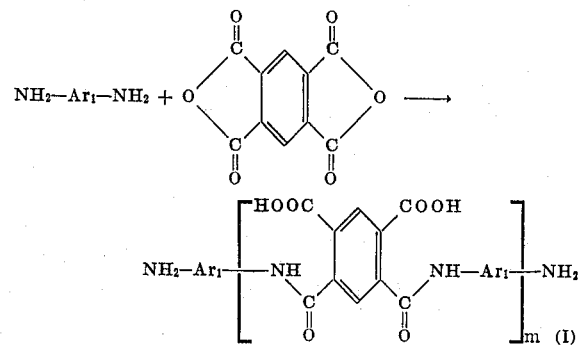

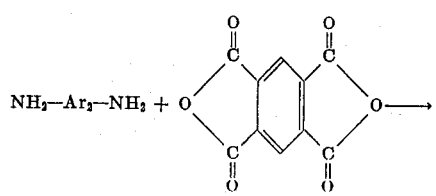

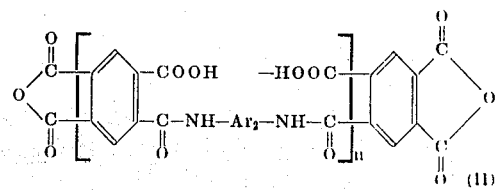

$m$ and $n$ are determined by the stoichiometry of the reactions. Reaction of I with II, followed by heating to convert the polymeric amic acid groups to cyclic imides, yields polymers of the present invention, the repeating structural units of which are set forth above. The examples below illustrate that when $m$ and $n$ have values ranging from say 3–5 to about 100, the polymers have elastic properties. Relatively short segments, especially short high-melting segments, favor elasticity. Elasticity is increased at the expense of the thermal resistance, when the low-melting segments exceed the high-melting segments. The degree of polymerization of the polymers of the present invention is sufficiently high that suitable filaments, fibers, film and the like can be prepared by conventional filament-forming and film-forming procedures.

It is within the scope of this invention to use the same or different aromatic dianhydrides in making the low-melting and high-melting prepolymeric segments. Thus, one may choose, for example, to combine pyromellitic dianhydride with a phthalic acid derived diamine in making low-melting segment, and to combine 3,3',4,4'-benzophenone tetracarboxylic dianhydride with a terephthalic acid diamine in making the high-melting segment; or alternatively, one may reverse the sequence of the dianhydrides, as has been done in several of the examples below. Other examples of aromatic acid dianhydrides include 2,3,6,7-naphthalenetetracarboxyl dianhydride; 3,3',4,4'-diphenyltetracarboxyl dianhydride; bis(3,4-dicarboxyphenyl)sulfone dianhydride; benzene-1,2,3,4-tetracarboxyl dianhydride; 1,1-bis-(3,4-dicarboxyphenyl)methane dianhydride; pyrazine-2,3,5,6-tetracarboxylic dianhydride and the like.

The manner of putting these segments together may take a number of forms. In one form (A), blocks of low-softening and high-softening segments are separately prepared by reacting prescribed molar proportions of the respective reactants in two reaction vessels. In reactor 1, in a typical example, a slight excess of an aromatic diamine containing ortho-positioned linking elements is reacted with an aromatic dianhydride to yield an ordered polymeric amic-acid (also referred to herein as a prepolymer) having a relatively low-softening point and amine end groups. In reactor 2, another aromatic diamine, containing meta- or para-positioned linking elements, is reacted with a slight excess of a dianhydride to yield another ordered prepolymeric amic-acid having a relatively high-softening point and anhydride end groups. The two prepolymers are then reacted together as described above to form the segmented precursor amic-acid polymer, subsequently converted to the elastomeric polyimide.

One of several obvious variations on method (A) is to prepare both prepolymers with a deficiency of dianhydride to insure that the resulting polymeric segments will have amino terminal groups. The separate prepolymeric units are then blended and reacted with additional dianhydride to form block polymers having relatively low-softening and high-softening segments.

In a second variation (B), of the invention, a first block prepolymer may be prepared as in (A), and to this product may simultaneously be added the desired stoichiometric proportions of another diamine and dianhydride. The product of this variation in procedure is almost inevitably less regular in structure than that from procedure (A), since it involves the simultaneous reaction of two diamines with anhydride. The degree of randomness of the resulting product will be markedly influenced by the relative reaction rates of the prepolymeric diamine and the second diamine. Thus, if the reaction rates were equal, the product should contain a completely random pattern of prepolymeric and second diamine units. If, on the other hand, the reactivity of the second diamine is much faster than that of the prepolymeric diamine, it is obvious that the block structure of the final polymer should approach very close to that of the product of procedure (A).

In procedure (B) the diamine with the ortho-bound components may be either the first or second diamine.

In a third variation (C) of the procedure, the reactants, consisting of an ortho-based diamine, a meta- or para-based diamine, and one or more dianhydrides, may be reacted simultaneously from the beginning. As in procedure (B) when the reaction rates of the diamines are more different, there is a greater tendency toward formation of block units.

The resulting final polymeric amic-acids from all these procedures can be cast into films, spun as fibers, or molded in bulk forms. A final heat treatment converts the amic-acid intermediate to a cyclic imide structure by elimination of water. Instead of a heat treatment it is also contemplated to chemically treat the polymeric amic-acids with any of the dehydrating systems used for such purposes, such as, for example, acetic anhydride in pyridine. The conversion can also be attained by a combination of a heat treatment and a chemical treatment.

Generally, it is preferable to form the desired shaped structure from the polyamide acid precursor prior to conversion to the polyimide. However, it may be possible to form the shaped article after a substantial conversion to the polyimide is accomplished.

The solvents useful for synthesizing the intermediate polyamide-acid compositions in the preferred method for preparing the polyimides of this invention must not react with the reactants to any appreciable extent. Besides being chemically inert to the reactants, the organic solvent should be a solvent for at least one and preferably both of the reactants. The preferred solvents are the lower molecular weight members of the N,N-dialkylcarboxylamide class, such as, for example, N,N-dimethylformamide; N,N-dimethylacetamide, and N,N-diethylformamide. Other suitable solvents which may be used are dimethyl sulfoxide, dimethylsulfone, hexamethylphosphoramide, N-methyl-2-pyrrolidone and formamide. The solvents may be used alone, or in combinations of two or more solvents.

By judicious choice of the nature and proportions of the reactants, one may prepare a variety of elastomeric, thermally resistant compositions containing block segments of varying sizes, compositions, and relative proportions of components.

The resulting products in film or fiber form show elastic properties above 200° C. and preferably in the range 250°–400° C. depending on the composition of the polymer and on the length of the respective sequences.

Unlike the segmented products of this invention, similar aromatic polymers derived from ortho-, meta-, or para-positioned diamines in which only one type of ring orientation is present do not display elasticity at high temperatures. This is true whether homo, block, or random copolymers are involved.

The following examples are illustrative of the present invention.

EXAMPLE I

In the following examples each reactor was a 300 ml. conical-bottomed three-necked flask equipped with a Trubore stirrer, gas inlet, and Drierite tube. Each system was flame-dried in a stream of dry nitrogen before use. Except where otherwise noted, all reactions were at 0° C. and all temperatures are given in centigrade. In each example films were cast and cured by spreading the amic-acid reaction solution on a glass plate, evaporating the solvent at 100°, stripping the film from the plate, and heating it in an oven, first at 140° for 20 hours, then at ° for 1 hour.

In the first example the reactions were carried out in two identical flasks, A and B. In flask A 0.41 g. (0.0012 mole) 2,2'-m-phenylene-bis-(5-aminobenzoxazole) and 5 ml. dry N,N-dimethylacetamide were treated with 0.218 g. (0.001 mole) pyromellitic dianhydride. In flask B 0.41 g. (0.0012 mole) 2,2'-o-phenylenebis(5-aminobenzoxazole) and 3 ml. dimethylacetamide were treated with 0.218 g. (0.001 mole) pyromellitic dianhydride. After both mixtures had been stirred for 4 hours, the contents of flask B were transferred to flask A, after which 0.087 g. (0.0004 mole) pyromellitic dianhydride and 1 ml. dimethylacetamide were stirred in. After 3 hours more, the solution was allowed to warm to room temperature and stirred 16 more hours. The cured film prepared from the final solution was strong and flexible and showed elastic properties in the range of 300°–400°.

The repeating unit in this polymer had the formula

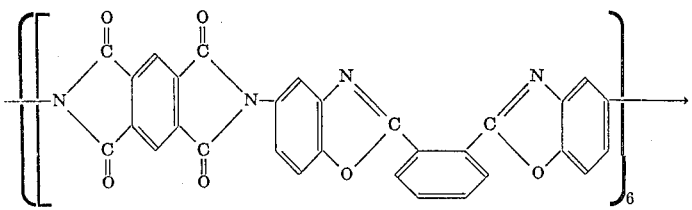

(low-melting segment)

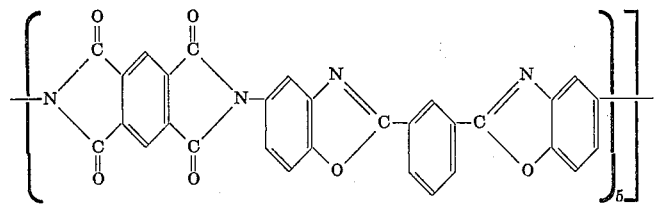

(high-melting segment)

Sufficient of these units are bound together for the polymer to be in at least the film-forming range.

EXAMPLE II

In this and most of the subsequent examples only one reactor was used, the structure of the final polymer being dependent on the order of addition and the relative reactivities of the reactants. The reactor was charged with 0.325 g. (0.00095 mole) 2,2'-o-phenylenebis(5-aminobenzoxazole) and 5 ml. N,N-dimethylacetamide. After addition of 0.322 g. (0.001 mole) 3,3',4,4'-benzophenonetetracarboxylic dianhydride, the mixture was stirred for 4 hours. Next, 0.418 g. (0.001 mole) 2,2'-bis(m-aminophenyl)-6,6'-bisbenzoxazole and 0.207 g. (0.00095 mole) pyromellitic dianhydride were added. After an additional 4 hours of stirring, still at 0°, the mixture was stirred 3 hours more at room temperature. After subsequent treatment as in example I, the mixture yielded strong, flexible films which showed elastomeric properties in the 300°–400° C. range.

The low-melting segments in this polymer had the average formula

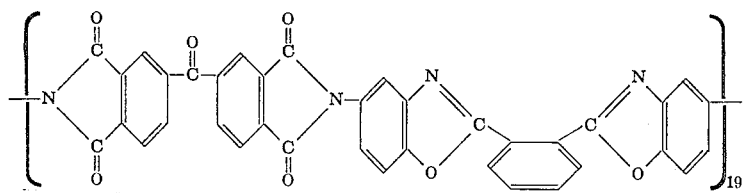

and the high-melting segments the formula

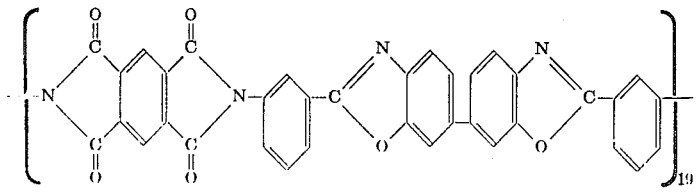

these units being bonded together by segments of the formula

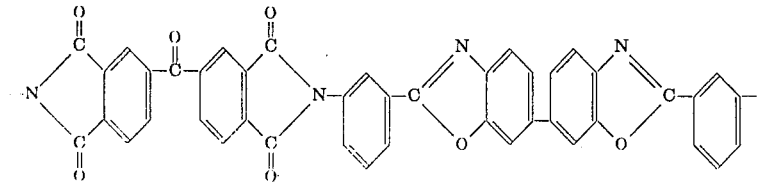

these being derived from the dianhydride of the low-melting and the diamine of the high-melting polymeric segments.

EXAMPLE III

In three experiments designed to show the effect on elasticity of varying the amounts of the reactants and thus the values of $m$, $n$, and degree of polymerization, polymers were prepared from two diamines and two dianhydrides as in example II. In a single reactor were placed 0.376 g. (0.0011 mole) 2,2'-o-phenylenebis(5-aminobenzoxazole) and 5 ml. N,N-dimethylacetamide, followed by 0.322 g. (0.001 mole) 3,3',4,4'-benzophenonetetracarboxylic dianhydride. After 18 hours of stirring, 0.171 g. (0.0005 mole) 2,2'-bis(m-aminophenyl)benzobisoxazole, 0.131 g. (0.0006 mole)pyromellitic dianhydride, and 1 ml. dimethylacetamide were added, and the solution was stirred for 6 hours longer. Films were cast and treated as before. In this run the calculated value for $m$ was 10; for $n$, 5. Two more runs were made following this same procedure, holding $m$ at 10 but changing $n$ by changing the 2,2'-bis(m-aminophenyl)benzobisoxazole to 0.342 g. (0.001 mole) in the second run and 0.068 g. (0.0002 mole) in the third run, with corresponding changes in the pyromellitic dianhydride to 0.240 g. (0.0011 mole, $n$=10) and 0.065 g. (0.0003 mole, $n$=2). The resulting films were characterized as shown in the following table.

TABLE.—PROPERTIES OF FILMS

| Units in lowmelting segments m | Units in highmelting segments n | Elasticity | Loss of strength, degrees |
|---|---|---|---|
| 10 | 10 | Fair | 400 |
| 10 | 5 | Good (295° up) | ca380 |
| 10 | 3 | Very good (275° up) | ca360 |

The low-melting segments in the products of this example had the structure

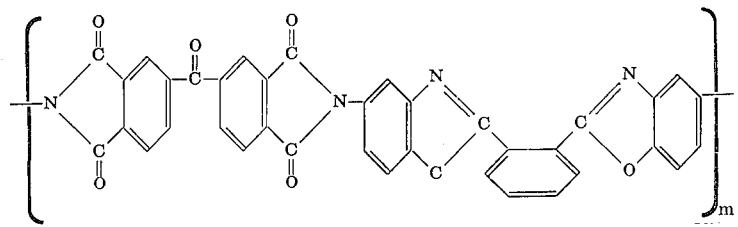

and the high-melting segments the structure

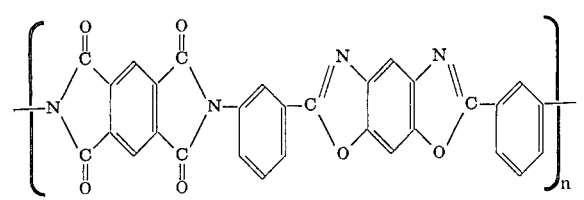

EXAMPLE IV

In a single reactor were placed 0.270 g. (0.0012 mole) 2-(p-amino-phenyl)5-aminobenzoxazole, 5 ml. N,N-dimethylacetamide, and 0.218 g. (0.001 mole) pyromellitic dianhydride ($n=6$). After 4 hours of stirring, 0.342 g. (0.001 mole) 2,2'-o-phenylenebis(5-aminobenzoxazole) and 0.262 g. (0.0012 mole) pyromellitic dianhydride were added ($m=5$).

After 2.5 hours more of stirring, 0.5 ml. dimethylacetamide was added, and stirring was continued at room temperature for 18 hours longer. The final films were strong and flexible and were elastic in the 290°–390° C. range. The average-repeating unit in this polymer has the formula

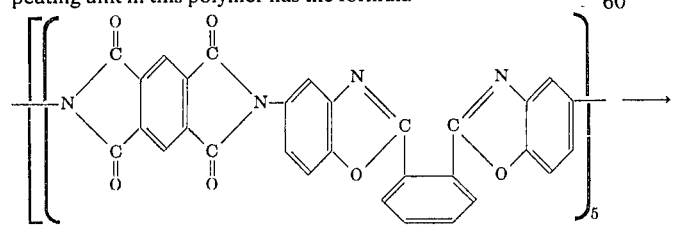

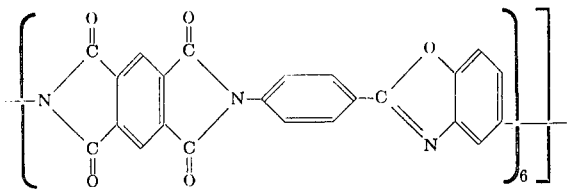

EXAMPLE V

The same reactants as in example IV, in the same quantities, were put together simultaneously and stirred for 6 hours at 0° and overnight at room temperature. The final films showed elastic properties, but to a lesser degree than those of example IV.

EXAMPLE VI

In this example 0.410 g. (0.0012 mole) 2,2'-o-phenylenebis-(5-aminobenzoxazole), 0.322 g. (0.001 mole) 3,3',4,4'-benzophenonetetracarboxylic dianhydride, and 5 ml. N,N-dimethylacetamide were stirred together for 4 hours, after which 0.252 g. (0.001 mole) 2,5-bis(p-aminophenyl)oxadiazole and 0.262 g. (0.0012 mole) pyromellitic dianhydride were added; and the mixture was stirred 3 hours more at 0°, and 18 hours at room temperature. The resulting films were tough and flexible and were elastic in the 300°–380° C. zone.

The low-melting segments in this example had the repeating units

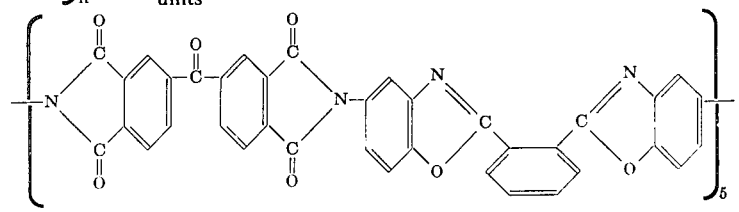

and the high-melting segments the units

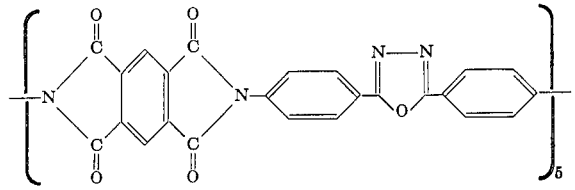

EXAMPLE VII

In this example the reactants and procedure of example III were used to give a polymer in which $m$ was 10 and $n$ was 1. The N,N'-dimethylacetamide solution of the amic-acid polymer was extruded through a multihole spinnerette placed just above a water coagulation bath. The resulting fibers were heated at 140° in air for 18 hours, and then at 300° for 1 hour. The final fibers had elastic properties in the 280°–380° range. Their other physical properties, at room temperature, were: denier, 22; tenacity, 1.36 g.p.d.; elongation, only 9.4 percent; initial modulus, 32.

EXAMPLE VIII

To determine the effect of high values of *m* and *n* on elasticity, 0.171 g. (0.0005 mole) 2,2'-o-phenylenebis(5-aminobenzoxazole), 2 ml. dimethylacetamide, and 0.157 g. (0.00049 mole) 3,3',4,4'-benzophenoneHtetracarboxylic dianhydride were stirred together for 6 hours at 0°, then for 1 hour at room temperature, in flask A; $m=49$. In flask B, 0.167 g. (0.00049 mole) 2,2'-bis(m-aminophenyl)benzobisoxazole, 4 ml. N,N'-dimethylacetamide, and 0.109 g. (0.0005 mole) pyromellitic dianhydride were simultaneously stirred together in the same way in flask B; $n=49$. The flasks were cooled again to 0° and the contents were combined in flask B (with the aid of an extra 2 ml. dimethylacetamide) and stirred overnight without external cooling. Films were cast and heated in the standard way. The films showed elastic properties above 300°, but their elongations at high temperature were lower than those of films with lower values of *m* and *n*.

EXAMPLE IX

In another experiment, the same reactants and proportions were used as in example VIII, except that the procedure of example III was followed; i.e., flask B was eliminated and its reactants were added directly to the prepolymer in flask A. The elastic properties of the resulting films were the same as those in example VIII.

Besides the variations in procedure illustrated in the above examples, other embodiments are within the scope of the invention. The choice of monomers is not limited by the examples given: the low-melting segments may contain other than o-phenylene groups, provided they remain thermally stable; e.g., some alicyclic units. Other heterocycles may be used; benzothiazoles, phthalimides, quinoxalines, thiazoles, benzimidazoles, pyrrones, etc.

The final polycondensation reaction need not be of the amic-acid-to-imide type; good results will also be obtained from the hydroxyamide-to-benzoxazole reaction or other heterocycle-forming reactions known to those skilled in the art.

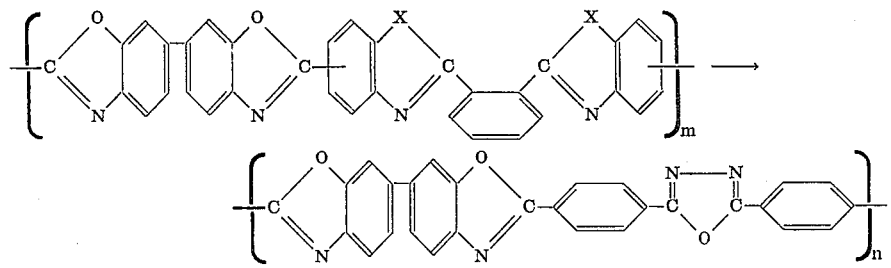

where *m* and *n* have the meaning described previously and where X may be O, S or NH, can be prepared by the same technique as described in the above examples, from 3,3'-dihydroxybenzidine, the diacid chloride of 2,5-bis(p-carboxyphenyl)-1,3,4-oxadiazole and a diacid halide of the formula

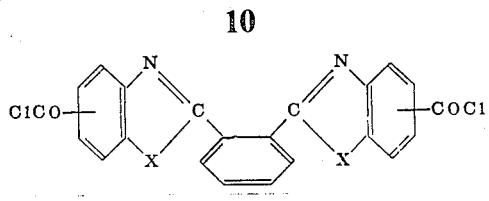

in which X may be -O-, -S-, or -NH-. The oxadiazole-containing diacid chloride could also be replaced by a diacid chloride containing other heterocycles; e.g., phthalimide, benzoxazole, etc.

The system is not limited to two different segments; the use of three or more segments may prove to be desirable.

We claim:

1. An essentially linear block aromatic imide polymer capable of being shaped into fibers and filaments having high-thermal stability and high elasticity even at elevated temperatures above 200° C. particularly characterized by having the following repeating structural units

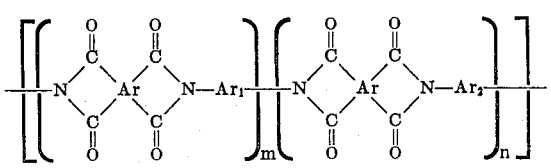

where Ar is a tetravalent residue of an aromatic dianhydride, $Ar_1$ is a divalent residue of o-phthalic acid derived diamine, $Ar_2$ is a divalent residue of an isophthalic acid or terephthalic acid derived diamine $Ar_1$ and $Ar_2$ both containing at least one five-membered heterocyclic ring having a heteronitrogen and a hetero-oxygen atom and selected from the group consisting of oxazoles and oxadiazoles, *m* and *n* are small whole numbers averaging from about 3 to about 100 with *m* segments comprising 35 to 65 percent by weight of the block copolymer and *n* segments comprising 65 to 35 percent by weight of the block copolymer.

2. An essentially linear block polymer capable of being shaped into fibers and filaments having high-thermal stability and high elasticity even at elevated temperatures above 200° C. particularly characterized by having the following repeating structural units

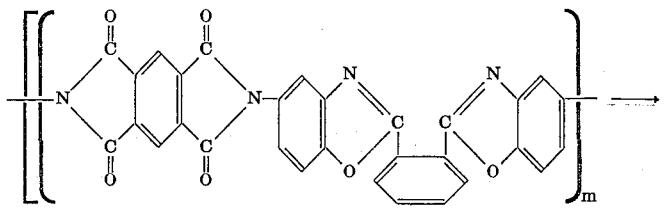

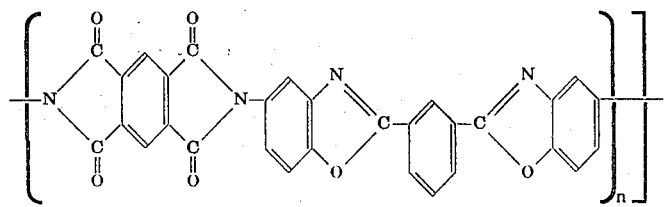

wherein *m* and *n* are small whole numbers each averaging from about 3 to about 100 with *m* segments comprising 35 to 65 percent by weight of the block copolymer and *n* segments comprising 65 to 35 percent by weight of the block copolymer.

4. An essentially linear block polymer capable of being shaped into fibers and filaments having high-thermal stability and high elasticity even at elevated temperatures above 200° C. particularly characterized by having the following repeating structural units

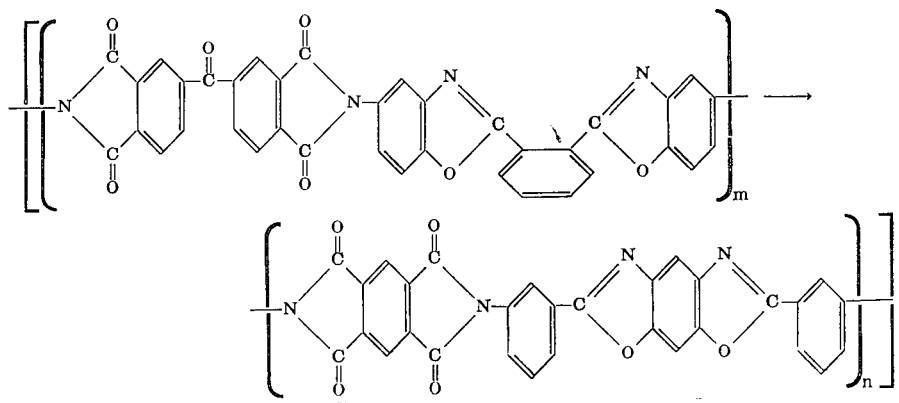

3. An essentially linear block polymer capable of being shaped into fibers and filaments having high-thermal stability and high elasticity even at elevated temperatures above 200° C. particularly characterized by having the following repeating structural units wherein *m* and *n* are small whole numbers each averaging from about 3 to about 100 with *m* segments comprising 35 to 65 percent by weight of the block copolymer and *n* segments comprising 65 to 35 percent by weight of the block copolymer.

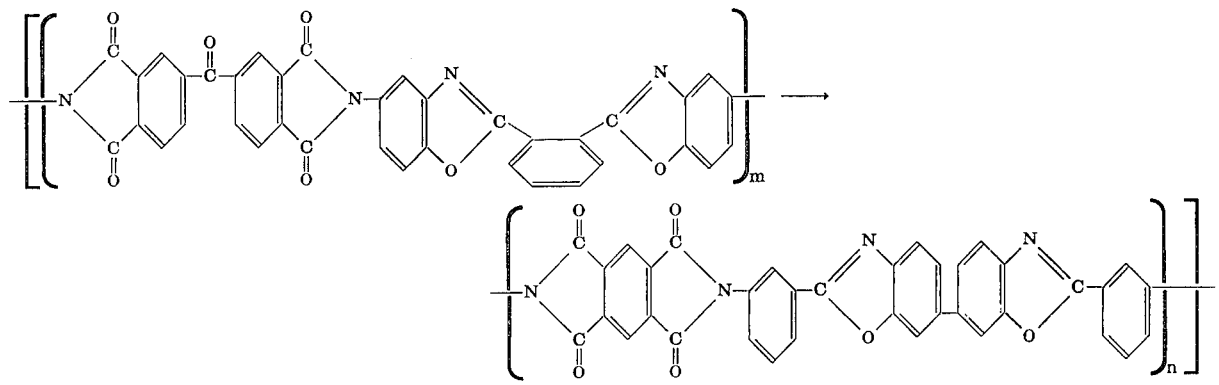

wherein *m* and *n* are small whole numbers each averaging from about 3 to about 100 with *m* segments comprising 35 to 65 percent by weight of the block copolymer and *n* segments comprising 65 to 35 percent by weight of the block copolymer.

5. An essentially linear block polymer capable of being shaped into fibers and filaments having high-thermal stability and high elasticity even at elevated temperatures above 200° C. particularly characterized by having the following repeating units

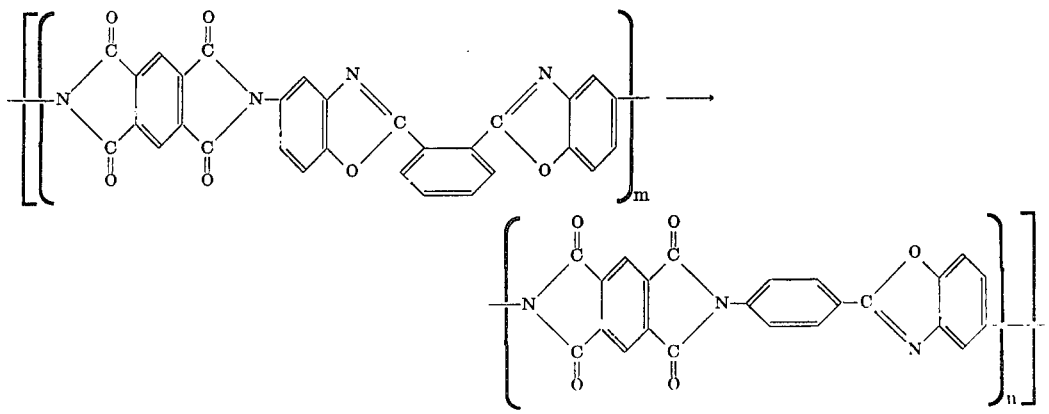

wherein *m* and *n* are small whole numbers each averaging from about 3 to about 100 with *m* segments comprising 35 to 65 percent by weight of the block copolymer and *n* segments comprising 65 to 35 percent by weight of the block copolymer.

6. An essentially linear block polymer capable of being shaped into fibers and filaments having high-thermal stability and high elasticity even at elevated temperatures above 200°

C. particularly characterized by having the following repeating units

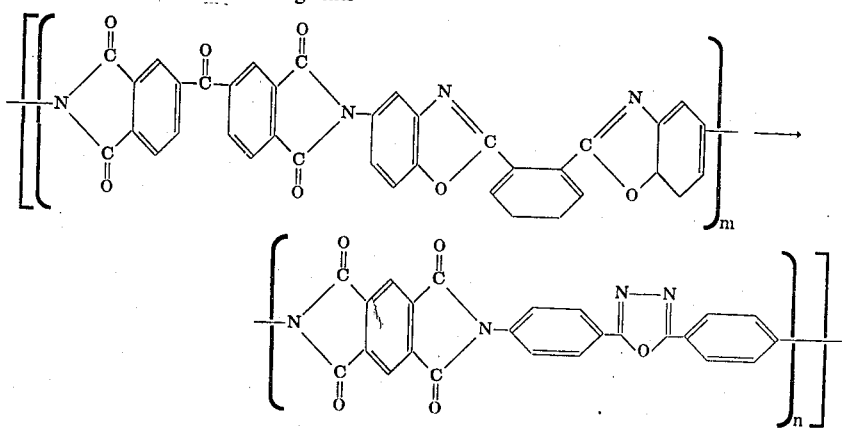

wherein *m* and *n* are small whole numbers each averaging from about 3 to about 100 with *m* segments comprising 35 to 65 percent by weight of the block copolymer and *n* segments comprising 65 to 35 percent by weight of the block copolymer.

7. A fiber or filament shaped from the polymer of claim 2.

* * * * *